United States Patent
Glavind et al.

(10) Patent No.: US 9,442,004 B2
(45) Date of Patent: Sep. 13, 2016

(54) LONG FIBRE OPTIC SENSOR SYSTEM IN A WIND TURBINE COMPONENT

(75) Inventors: Lars Glavind, Randers C (DK); Thomas Hjort, Vejle Øst (DK); Ib Svend Olesen, Randers (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 13/988,493

(22) PCT Filed: Nov. 23, 2011

(86) PCT No.: PCT/DK2011/050446
§ 371 (c)(1),
(2), (4) Date: Jun. 20, 2013

(87) PCT Pub. No.: WO2012/069058
PCT Pub. Date: May 31, 2012

(65) Prior Publication Data
US 2013/0278918 A1    Oct. 24, 2013

Related U.S. Application Data

(60) Provisional application No. 61/417,690, filed on Nov. 29, 2010.

(30) Foreign Application Priority Data

Nov. 24, 2010  (GB) .................................. 1019956.0

(51) Int. Cl.
| | | |
|---|---|---|
| G01J 1/04 | (2006.01) | |
| F03D 9/00 | (2016.01) | |
| F03D 11/00 | (2006.01) | |
| G01D 5/353 | (2006.01) | |
| G01M 5/00 | (2006.01) | |
| G01M 11/08 | (2006.01) | |
| H02K 9/24 | (2006.01) | |

(52) U.S. Cl.
CPC ............ *G01J 1/0425* (2013.01); *F03D 9/002* (2013.01); *F03D 11/0091* (2013.01);*F03D 17/00* (2016.05); *G01D 5/35303* (2013.01); *G01D 5/35316* (2013.01); *G01D 5/35345* (2013.01); *G01M 5/0016* (2013.01); *G01M 5/0033* (2013.01); *G01M 5/0091* (2013.01); *G01M 11/083* (2013.01); *H02K 11/25* (2016.01); *H02K 9/24* (2013.01); *Y02E 10/722* (2013.01); *Y02E 10/725* (2013.01)

(58) Field of Classification Search
CPC ............... F03D 11/0091; F03D 9/002; G01D 5/35303; G01D 5/35316; G01D 5/35345; G01J 1/0425; G01M 5/0016; G01M 11/083; G01M 5/0033; G01M 5/0091; H02K 11/0047
USPC ................ 356/32, 73.1; 324/244.1; 374/142; 250/227.14
See application file for complete search history.

(56) References Cited

U.S. PATENT DOCUMENTS

| | | | | |
|---|---|---|---|---|
| 4,761,073 | A * | 8/1988 | Meltz .................... | G01B 11/16 250/227.18 |
| 5,066,133 | A * | 11/1991 | Brienza ....................... | 359/570 |
| 5,684,297 | A * | 11/1997 | Tardy ................ | G01D 5/35383 250/227.14 |
| 6,404,956 | B1 * | 6/2002 | Brennan et al. ................ | 385/37 |
| 7,379,169 | B1 | 5/2008 | Kraemer et al. | |
| 2004/0245444 | A1* | 12/2004 | MacDougall ............ | 250/231.19 |
| 2006/0204174 | A1* | 9/2006 | Jones .............................. | 385/37 |
| 2008/0204706 | A1* | 8/2008 | Magne ................ | G01M 5/0025 356/32 |
| 2008/0285909 | A1* | 11/2008 | Younge ................ | A61B 5/1076 385/13 |
| 2009/0245717 | A1* | 10/2009 | Iversen et al. ................... | 385/12 |

FOREIGN PATENT DOCUMENTS

| | | |
|---|---|---|
| GB | 2402479 A | 12/2004 |
| GB | 2440953 A | 2/2008 |
| GB | 2443575 A | 5/2008 |
| GB | 2461532 A | 1/2010 |
| GB | 2461566 A | 1/2010 |
| WO | 2008/034225 A1 | 3/2008 |
| WO | 2009/095025 A1 | 8/2009 |

OTHER PUBLICATIONS

Colpo, F., et al., "An experimental numerical study of the response of a long fibre Bragg grating sensor near a crack tip; An experimental numerical study of the response of a long FBG sensor near a crack tip", Smart Materials and Structures, IOP Publishing Ltd., Bristol, GB, vol. 16, No. 4, Aug. 1, 2007, pp. 1423-1432, XP020120549, ISSN: 0964-1726, D)I: 10.1088/0964-1726/16/4/057, the whole document.
Kajiwara, K., et al.;: "Distributed sensing in a long-length FBG based on synthesis of optical coherence function with 1-kHz sampling rate", Lasers and Electro-Optics, 2009 Conference on Quantum Electronics and Laser Science Conference. CLEO/QELS 2009. Conference on, IEEE, Piscataway, NJ, USA, Jun. 2, 2009, pp. 1-2, XP031520562, ISBN: 978-1-55752-869-8, the whole document.
Byoung Chang Lee et al.: "Long distance FBG sensor interrogation using 1.3 Â[mu]m FDML wavelength swept laser", 2010 Conference on Lasers and Electro-Optics (CLEO) May 16-21, 2010 San Jose, CA, USA, May 16, 2010, pp. 1-2, XP031700750, ISBN: 978-1-55752-890-2, the whole document.
International Search Report, PCT/DK2011/050446, Feb. 28, 2012.
Great Britain Search and Examination Report, GB1019956.0, Jan. 17, 2011.

\* cited by examiner

*Primary Examiner* — Kara E Geisel
*Assistant Examiner* — Dominic J Bologna
(74) *Attorney, Agent, or Firm* — Patterson + Sheridan LLP

(57) ABSTRACT

A sensor system for measuring an operating parameter of a wind turbine component is described. The fiber optic sensor system comprises a light source for outputting light in a predetermined range of wavelengths, and an optical fiber comprising a long Fiber Bragg Grating, extending continuously over a length of the optical fiber to provide a continuous measurement region in the optical fiber. The optical fiber is coupled to the wind turbine component such that the continuous measurement region is located at a region of the wind turbine component to be sensed, and such that the grating period at each location in the continuous measurement period is dependent upon the value of the operating parameter at that location. A light detector receives light from the optical fiber, and provides an output signal to the controller indicating the intensity of the received light; based on the detected light, a value for the operating parameter is determined.

19 Claims, 6 Drawing Sheets

LONG FIBRE OPTIC SENSOR SYSTEM IN A WIND TURBINE COMPONENT

The invention relates to a fibre optic sensor system for a wind turbine component, and in particular to a system for detecting variations in an operating parameter of the component along an extended path.

It is known to use fibre optic sensors to measure the operating properties of wind turbine components. Usually such sensors measure the strain or deformation of a wind turbine component, or operating temperatures, pressures, and magnetic fluxes for example.

While such sensors can operate using interferometry based detection techniques, many fibre optic sensors rely on Fibre Bragg Gratings (FBGs). FBGs are periodic variations in the refractive index of the fibre that, depending on the period, reflect light of a certain wavelength and allow other wavelengths of light to pass.

FBGs are traditionally formed by exposing the region of the fibre to a laser that writes the grating directly into the fibre material. The grating is fabricated either by the interference of two such beams, or by using a single beam and a photomask. Typical fabrication techniques therefore limit the length of the grating to the diameter of the etching laser beam, or to the length of the corresponding photomask. In many cases, the length of the resulting FBG is limited to around 15 cm.

In a sensor system, FBGs are positioned such that variations in the temperature, strain or pressure in the system being monitored, result in a change to the period of the grating, and a detectable change in the wavelength of the light that is reflected by the FBG. By detecting either the reflected light or the transmitted light, the sensor system can then deduce the magnitude of the change to the detected parameter.

A single fibre can contain multiple FBGs each position at a different location in the system. The FBGs can then be individually addressed using time division multiplexed TDM light signals, or by constructing the FBGs to have different grating periods, and using light of different wavelengths. This is known as Wavelength Division Multiplexing (WDM).

TDM systems, however, for example may require spacing of 2 meters or more between FBGs in order to provide acceptable signal resolution reducing the number of FBGs than can practically be used in a single fibre. For WDM cases, the number of FBGs with different periods that can be installed into a single fibre is also typically often limited to 10 to 20, due to limitations in spectral analysis.

Sensor systems based on FBGs as described above are useful, but can be difficult to implement in more complicated systems. First, as FBGs are discrete, an FBG has to be located in each position of interest. This means that the sensor installation engineers must typically guess in advance where the positions of interest are, such as temperature hotspots in a generator for example, and ensure that a sensor FBG is duly installed. As it is often not practical to locate FBGs everywhere, this leads to a lack of data for locations intermediate the FBG sensor locations, and can mean that important data is simply not available.

Furthermore, as each FBG has a default grating period, the FBG has an optimum detection range, based on the grating period, and the amount that the grating period is expected to change under the influence of variations in the local measured parameter. Large variations in temperatures for example can therefore be difficult to detect accurately using FBGs.

The nacelle of a wind turbine for example contains carefully calibrated electrical generation and sensing equipment. Such equipment generates heat during its operation and must be carefully monitored and controlled to maintain operation within defined operating parameters. It is presently difficult to monitor such equipment adequately, due to physical constraints such as limited space, and in many cases due to the structural complexity of the component, and the large possible variation in operational temperatures across the component structure.

It would, for example, be desirable to monitor the operating temperatures of the generator in the nacelle, but due to the complexity of the rotor and stator design and associated windings, this is not easy to achieve.

We have appreciated that it would be desirable to provide a more flexible sensor system that can provide information over a wide range of temperatures or other operational parameters and operate over an extended area without requiring undue complexity of installation. We have appreciated that long Fibre Bragg Gratings can be used to address this problem.

SUMMARY OF THE INVENTION

The invention is defined in the independent claims to which reference should now be made. Advantageous features are set forth in the dependent claims.

According to an example embodiment of the invention, there is provided a wind turbine having a fibre optic sensor system for measuring an operating parameter of a wind turbine component, the fibre optic sensor system comprising: a light source for outputting light in a predetermined range of wavelengths; an optical fibre comprising a long Fibre Bragg Grating, the long Fibre Bragg Grating having a grating of a predetermined grating period extending continuously over a length of the optical fibre to provide a continuous measurement region in the optical fibre, wherein the optical fibre is coupled to the wind turbine component such that the continuous measurement region is located at a region of the wind turbine component to be sensed, and such that the grating period at each location in the continuous measurement period is dependent upon the value of the operating parameter at that location; a light detector for receiving light from the optical fibre, and for providing an output signal to the controller indicating the intensity and wavelength of the received light; a controller coupled to the light detector for determining, based on the detected light, a value for the operating parameter.

The long FBG enabled optical fibre provides an extended continuous measurement region. Further, the operating parameter over the entire region can be sensed without it being necessary to provide a plurality of discrete short FBGs at each location of interest. In particular, this means that in a temperature sensing systems for example, it is not necessary in advance to predict where the hotspots of the component will lie, as the temperature along the entire length of the FBG can be detected. For other operational parameters that are being measured, the same advantages apply.

By contrast, a system based on a plurality of short FBGs would be more complex to implement in terms of the additional signal separation needed, either using time or wavelength division multiplexing, and less useful, due to the need to predict in advance where short FBGs sensors should be located. The long FBG also makes it possible at the very least information to extract information about the maximum and minimum parameter values, as a feature of the FBG itself.

In one embodiment, the grating of the long Fibre Bragg Grating is constructed to reflect a maximum amount of light over a small fraction of the length of the grating. This allows each parameter value to be represented by an associated intensity value, providing more information about the distribution of parameter values along the measurement region.

Advantageously, the point at which the maximum input light at the first wavelength is reflected is equal to the length of the continuous measurement region. This means that all of the light input into the optical fibre can potentially be reflected back within the measurement region, increasing the signal strength.

Accordingly, the controller may therefore be operable to determine a range of values for the operating parameter and a value indicating how frequently that value occurs in the continuous measurement region. Thus, the single optical fibre can provide at least maximum and minimum values, as well as a modal value.

In an alternative embodiment, the grating of the long Fibre Bragg Grating is constructed to reflect light having a first wavelength such that the amount of the light reflected is irrespective of the distance the light has travelled in the fibre. In this way, substantially all of the light input into the fibre is reflected by any part of the grating having the appropriate period, and the signal received from the sensor is stronger.

Accordingly, the controller may be operable to determine a maximum and a minimum value for the range of operating parameters occurring in the continuous measurement region.

The optical fibre may comprise a second long Fibre Bragg Grating, providing a second continuous measurement region in the optical fibre. Further, the second long Fibre Bragg grating may be located in a different part of the optical fibre to the first long Fibre Bragg grating. This allows a plurality of measurements to be made at different locations with a single fibre.

The second long Fibre Bragg Grating may also have a different predetermined grating period to the first. This allows the second long Fibre Bragg Grating to be used to detect a different parameter or a different range of the same parameter as the first.

In a further example embodiment, the grating period of the long Fibre Bragg Grating alternates periodically between two values over the length of the continuous measurement region. This allows two Bragg gratings to be used within the same region of the fibre, and allows two separate measurements to be taken at the same fibre position.

In a specific example, the continuous measurement region of the optical fibre is provided in the stator slots or coil windings of a generator to measure at least the temperature throughout a region of the slot or of the winding. This can be used in part of a generator surveillance system which can improve the design of the generator and increase its life.

The optical fibre can also comprise one or more short Fibre Bragg Gratings at points in the optical outside of the continuous measurement regions. In particular, the continuous measurement region of the optical fibre can be provided in the stator slots or coil windings of a generator to measure at least the temperature throughout a region of the slot or of the winding, and the short Fibre Bragg Gratings are located outside of the coil windings or stator slots.

A corresponding method is also provided.

BRIEF DESCRIPTION OF THE DRAWINGS

Preferred embodiments of the invention will now be described, by way of example, and with reference to the drawings in which.

DETAILED DESCRIPTION OF PREFERRED EMBODIMENTS

Traditional FBGs, of the kind described in the introduction above, can be thought of as short gratings, in the sense that the FBG size is limited by the diameter of the etching laser, and they only therefore take up a short section of the fibre length.

Techniques are now known for increasing the length of fibre in which the FBG is formed by connecting discrete gratings together. Essentially, a first grating is etched into the fibre, the fibre is then translated by a grating period and a further grating is written partially overlapping the first. In this way, gratings of up to 3$m$ in length have been manufactured. However, the operational length of the grating is limited by the precision of the fabrication technique, and until recently it was not possible to construct longer gratings using this technique.

Recent developments have however made it possible to fabricate FBGs that extend along the length of the optical fibre for as much as 10 m. Not surprisingly, such FBGs are called 'long' or even 'very long' Fibre Bragg Gratings. A method of constructing a very long FBG is discussed in the paper by Krister Fröjdh, entitled "Manufacture of Very Long Fiber Bragg for Dispersion Compensation Applications", published in 2010, by the Optical Society of America, in which shorter sections of grating of around 350 mm were stitched together into a larger whole.

In other methods of manufacture, an optical fibre can be translated through the interference pattern of the etching laser beam. Assuming that the induced perturbation in the fibre's refractive-index is proportional to the radiation intensity of the laser, then the period of the grating written will depend on both the velocity at which the fibre is translated as well as the wavelength of the interference pattern. This means that a Fibre Bragg Grating of almost any length can be manufactured by changing the frequency of the light-amplitude modulation or the velocity of the fibre.

A first embodiment of the invention will now be described with reference to FIGS. 1 and 2.

Figure 1:
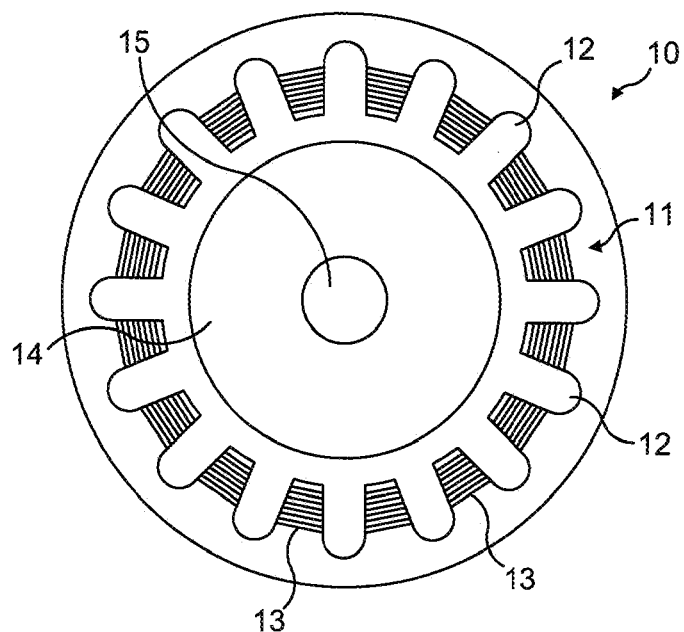
FIG. 1 is a schematic cross-sectional view of a generator, such as that used in a wind turbine nacelle.

FIG. 1 schematically illustrates the generator of a wind turbine nacelle in a cross-sectional view. The generator 10 comprises a stator 11, having a plurality of stator slots 12, with coil windings 13. Located inside the stator is a rotor 14 carried on a shaft 15. On the rotor, a plurality of magnet assemblies 16 (shown in FIG. 2) are provided for creating a magnetic flux. The shaft 15 is connected to the wind turbine rotor hub and blades, so that as the wind turbine blades rotate, the magnetic flux created by the magnet assemblies 16 rotates within the stator and induces a current in the coil windings 13.

Figure 2:
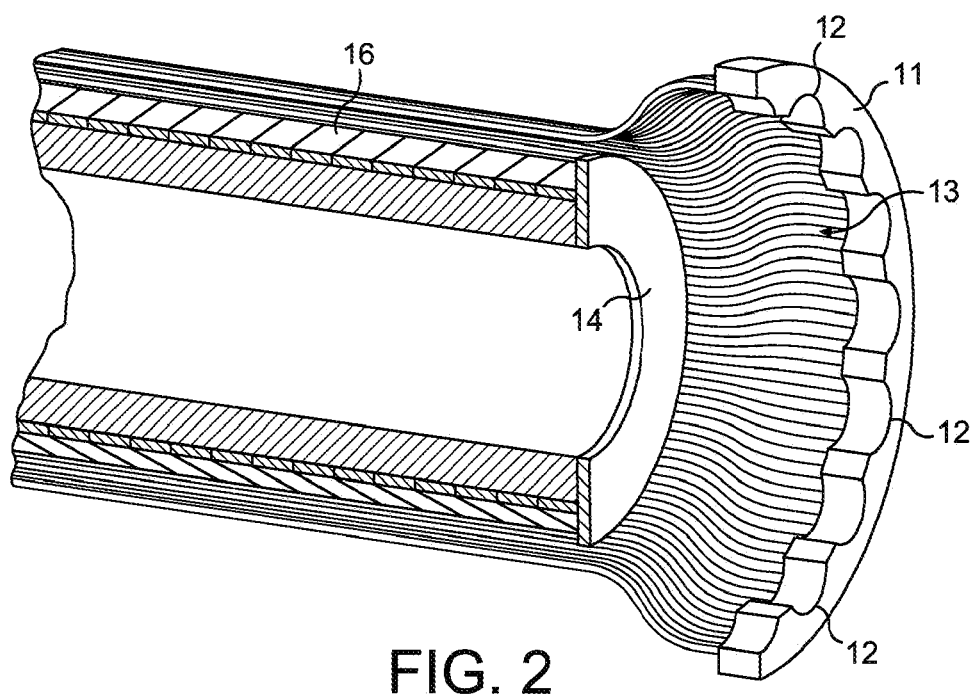
FIG. 2 is a schematic elevation view of the generator of FIG. 1.

The generator 10 is shown in a schematic elevation view in FIG. 2. In this view the shaft 15 has been omitted to avoid obscuring the detail of the rotor and the stator. The generator housing and connections with the electrical conditioning equipment, such as transformers, converters, and transmission lines are not shown in FIG. 1 or 2.

Figure 3:
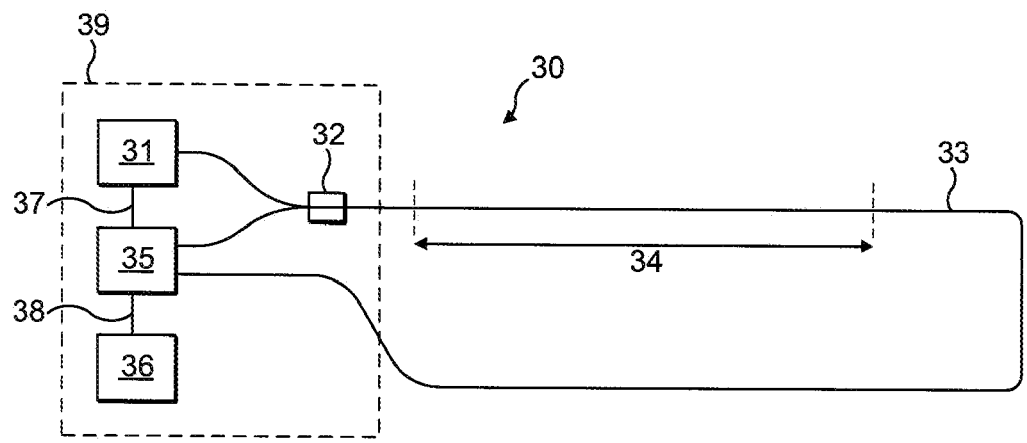
FIG. 3 illustrates an example embodiment of a sensor system according to the invention.

An example embodiment of a sensor system according to the invention will now be described with reference to FIG. 3.

The sensor comprises a wide band light emitting device 31, such as an LED, or SLED (superluminescent LED), a tunable laser, halogen or metal halide source, an optical splitter 32, and an optical fibre 33 coupled to the optical splitter 32 to receive light from the light emitting device 31. Part of the length of the optical fibre 33 comprises a long Fibre Bragg Grating 34 forming a measurement region 34. As noted in the description above, the length of the long Fibre Bragg Grating, and therefore the length of the measurement region 34 may be anywhere between one and several meters long.

A light collecting device 35, such as a photo-diode, photo-transistor, or device, such as an interrogator, is also connected to the optical splitter 32 to receive light reflected from the long FBG measurement region 34. A controller 36 is connected to both light emitting device 31 and light collecting devices 35, by connections 37 and 38, such as wires or cables. One or all of components 31, 32, 35, 36, and connections 37 and 38 may be housed in a mounting box 39 for easy installation in the inside of a wind turbine nacelle for example. The mounting box 39 can provide electrical insulation for the components if necessary.

In an alternative embodiment, the optical splitter 32 can be omitted, and the optical fibre 33 may be looped back after the long FBG measurement region 34, to connect to the light collecting device 35. In this way, the non-reflected light transmitted by the long FBG measurement region 34 can also be detected. In FIG. 3, both possibilities are illustrated so that the light collecting device 35 will receive the light both reflected and transmitted by the long FBG measurement region 34. In practice, example embodiments of the invention can operate based on one or both of the reflected and transmitted light signals.

The controller 36 controls the light emitting device 31 to input light signals into the optical fibre 33, optionally according to a time or wavelength division multiplexing scheme where these are desired. The controller 36 also acts to analyse the data received from the light collecting device 35 as will be described below.

In use, the optical fibre 33 is installed in the wind turbine component whose operating parameter is to be detected. The optical fibre 33 is particularly arranged so that the long FBG measurement region 34 of the optical fibre 33 is located in the wind turbine component region of interest.

For example, with reference to the wind turbine generator shown in FIGS. 1 and 2, we have appreciated that it would be useful if the temperature of the generator electrical windings 13 could reliably be detected. In operation, the electrical windings 13 of the stator 11 will become hot as they conduct the electrical current induced by the changing magnetic field of the rotor 14. However, in order for the generator to be certified as safe for operation it is necessary to ensure that the temperature of the windings 13 does not exceed predetermined safety parameters. To date, as there has been no practical way of monitoring in real time the operating temperature of the windings, it has been necessary to build into the generator design margins of safety, such as increased separation and spacing between windings 13 and other components, and lower cut-off or switch out thresholds for the electrical circuits of the generator when electrical currents become high.

Figure 4:
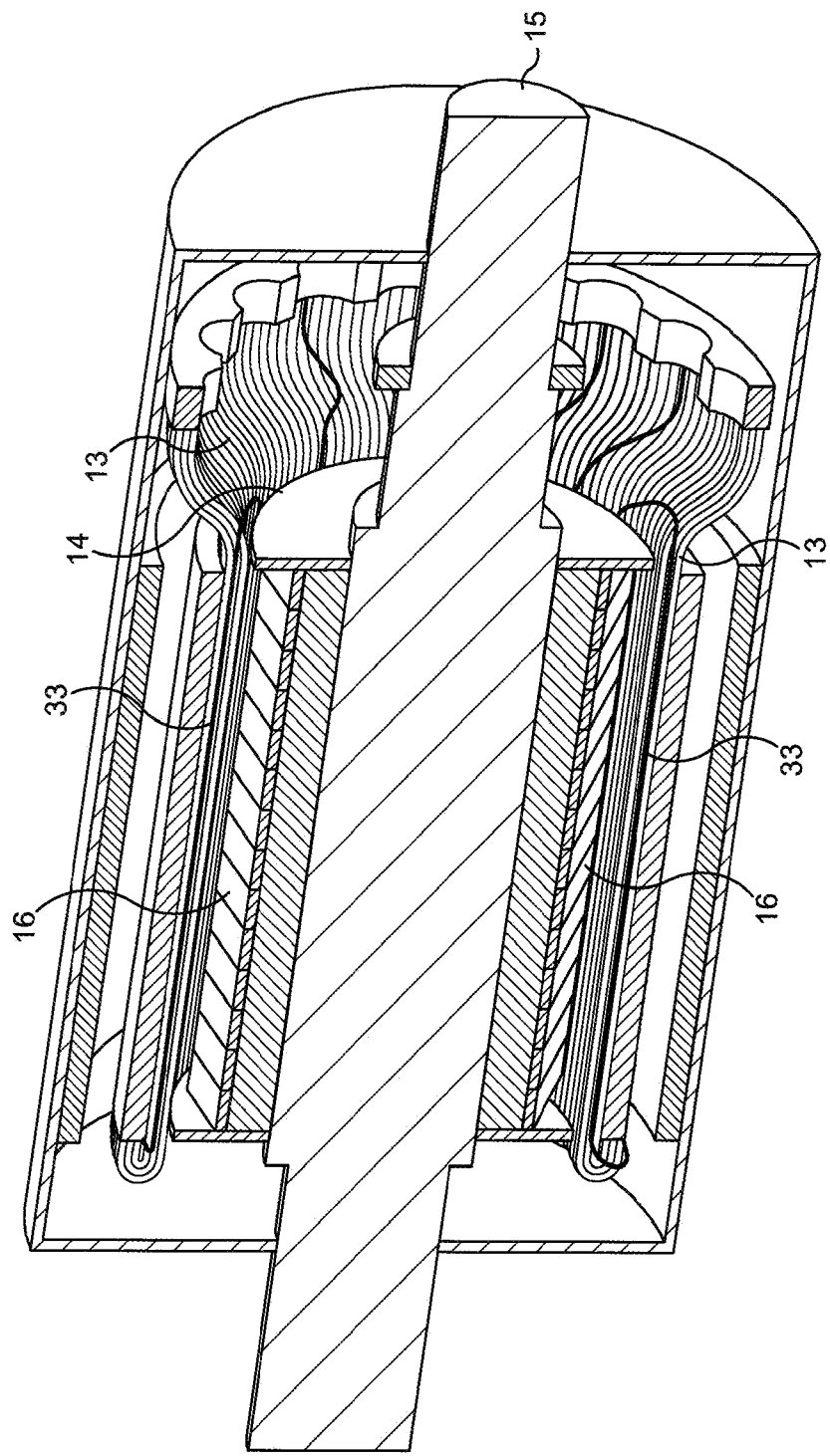
FIG. 4 is a schematic illustration of a generator in which the optical fibre component of the sensor system shown in FIG. 3 has been installed.

In one example embodiment of the invention, therefore, the long FBG measurement region 34 of the optical fibre is inserted into the stator slots 12 of the generator so that it is installed along the length of the coil windings within the slot 12. A single optical fibre may be installed in a plurality of slots, by simply winding it back and forth around the stator housing 11, as shown in FIG. 4 for a cross-sectional view of a generator and housing.

In this way, it is not necessary to guess in advance which parts of the windings are likely to get hot, as in effect, the temperature along the whole or along a substantial part of the winding can be measured. Further, the parts of the long FBG measurement region that are outside of the enclosed stator slots can also be used to detect the temperatures of other parts of the stator and generator structure using a single fibre. In alternative embodiments, more than a single optical fibre could be used if desired, such as a single optical fibre 33 and single long FBG measurement region 34 per stator slot 12.

The operation of the sensor system detecting temperature will now be described in more detail with respect to FIG. 5, which shows by way of example a potential output of the sensor system.

Figure 5:
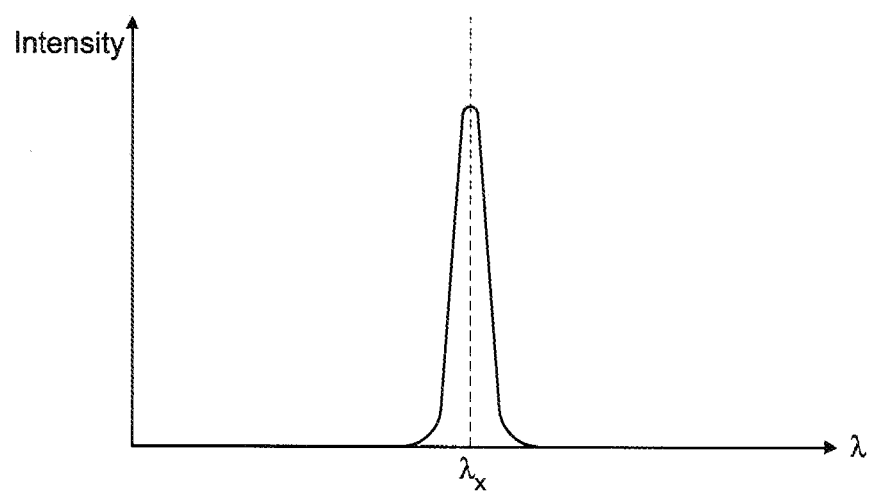
FIG. 5 is a schematic illustration of the output received from the sensor system shown in FIG. 3 for a long FBG at a uniform temperature.

In FIG. 5, it is assumed that the long FBG measurement region 34 of the optical fibre 33 is installed along an extended measurement path, such as around the stator windings of a generator, or within the coil windings themselves, and that a range of temperatures are encountered along the length of that measurement path. Such a situation is illustrated in FIG. 4.

For sensor embodiments that are configured to detect generator temperatures for example, it is advantageous to use light having a wavelength in the range of 1520 nm to 1580 nm. Light of 1550 nm for example corresponds to a grating of approximately 500 nm. For other implementations, different light wavelengths and grating periods may be appropriate, as would be apparent to the skilled person.

We shall assume that the long FBG measurement region 34 is an FBG having a default grating period of $d_{def}$, and that the light emitting device 31 inputs light with a variety of wavelengths into the optical fibre 33. If the temperature of the optical fibre at each location x in the long FBG measurement region is the same, then the grating period $d_x$ of the long FBG at each point will be uniform. In other words $d_x$ will essentially be dependent on the temperature but will be single valued. Under this temperature regime, if light is inserted into the optical fibre, then light of a single wavelength $\lambda_{dx}$ will be reflected by the FBG and be detected at the light collecting device 35, either as a peak in the reflected light, or as a dark band in the spectrum of light wavelengths transmitted by the fibre.

Now, we consider the case in which the temperature of the long FBG measurement region 34 varies along its length x, as would be the case where the optical fibre is used to measure the temperature along an extended path where it will encounter a range of temperatures. In this case, there will necessarily be one or more locations on the long FBG measurement region where the lowest temperature $T_{min}$ in the range is encountered, and one or more other locations where the highest temperature $T_{max}$ is encountered. For the time being, we assume that there are no intermediate temperatures, and that the temperature is simply one or the other of $T_{min}$ or $T_{max}$. In this case, only those wavelengths of light corresponding to $T_{min}$ or $T_{max}$, which we can call $\lambda_{min}$ and $\lambda_{max}$ will be reflected by the long FBG and detected at the light collecting device 35, either as a peak in the reflected light, or as a dark band in the spectrum of light wavelengths transmitted by the fibre. This situation is shown in the schematic illustration of FIG. 6 for the reflected light intensity. In this example, as we assume that the grating is hard written into the fibre, and that we have perfect reflection for light at a given Bragg wavelength, the peaks shown in the Figure have essentially the same height.

The terms 'hard' and 'soft' written gratings will be understood to refer to the result of exposing the fibre to the writing laser for different periods of time to thereby adjust the refractive index and reflectivity of the fabricated grating.

In practice of course, it is likely that a continuous range of temperatures between $T_{min}$ and $T_{max}$ will be encountered by the long FBG measurement period 34 of the optical fibre. In this case, the FBG grating period will, for at least one position in the measurement region 34, adopt a grating period corresponding to a wavelength of light between $\lambda_{min}$ and $\lambda_{max}$. The corresponding intensity diagram for the reflected light will therefore be like that shown in FIG. 7, namely a flat top distribution in which all intermediate wavelengths of light are intercepted by regions of the FBG grating at temperatures intermediate $T_{min}$ and $T_{max}$. Of course, should any temperatures within the range of $T_{min}$ and $T_{max}$ not be encountered in the long FBG measurement region 34 of the fibre 33, then these will appear in FIG. 7 as troughs or valleys (in the same way as for FIG. 6).

In an alternative embodiment, the optical fibre could be soft written, so that perfect Bragg reflection does not occur. In this case, we can assume that, for a long FBG measurement region 34 having a uniform temperature, all of input light at a wavelength corresponding to the FBG grating period will be reflected back after a length l. If the length l is made to be approximately equal to the length of the measurement region 34, then the intensity graph for a fibre at a uniform temperature will look like the graph shown in FIG. 5.

Where the temperature varies over the length l of the measurement region 34, then as before, the different regions of the long FBG which have adopted a different grating period due to the different local temperature will reflect different wavelengths of light. However, in this case, the reflection will not be perfect, and the amount of light reflected for a particular wavelength will depend on the distance that light of that wavelength had to travel through the grating with a corresponding Bragg wavelength. This is illustrated in FIG. 8 to which reference should now be made.

Figure 6:
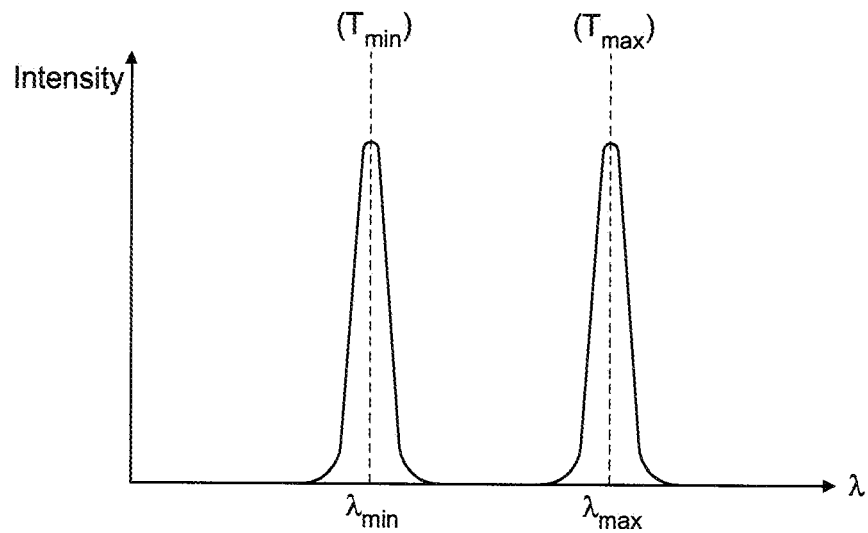
FIG. 6 is a schematic illustration of the output received from the sensor system shown in FIG. 3 for a long FBG indicating only two temperature values.
Figure 8:
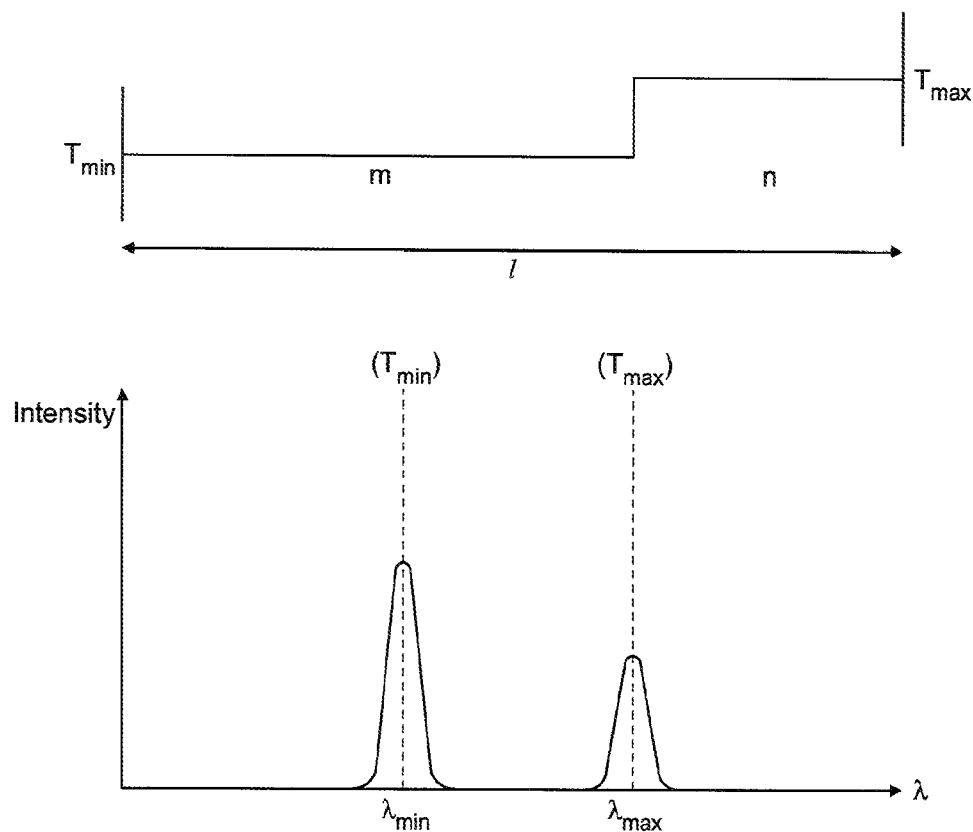
FIG. 8 is a schematic illustration of the output received from the sensor system shown in FIG. 3 for a long FBG indicating only two temperature values, where the corresponding light signals have variable intensities.

The situation illustrated in FIG. 8 is like that of FIG. 6, in which we assume that the long FBG measurement region is exposed to only two temperatures labelled $T_{min}$ and $T_{max}$. In this example, however, we additionally know that the long FBG 34 experiences a temperature $T_{min}$ only for a distance m along the length l, and experiences a temperature $T_{max}$ only for a distance n along the length l, where l=m+n and m>n. In this case, more light is reflected by the long FBG fibre grating in the region m than for the region n and the corresponding peak of the reflected light intensity diagram for wavelength $\lambda_{max}$ is therefore smaller than for the peak at the wavelength $\lambda_{min}$.

Figure 9:
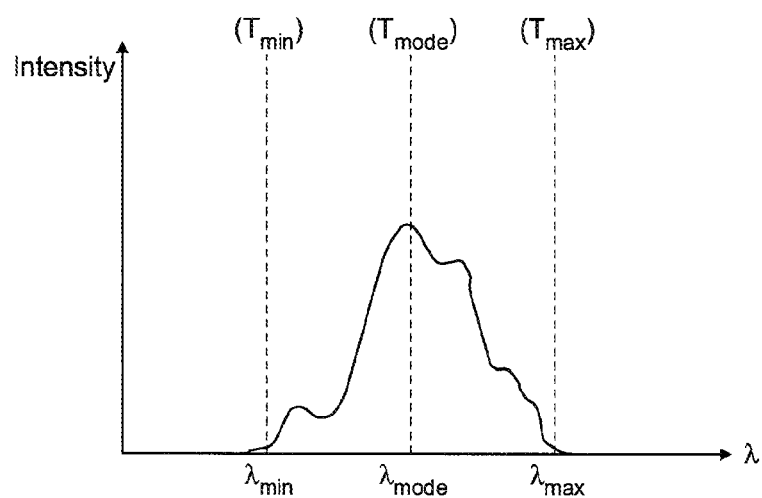
FIG. 9 is a schematic illustration of the output received from the sensor system shown in FIG. 3 for a long FBG indicating a range of temperatures, where the corresponding light signals have variable intensities.

If we now assume that the temperatures experienced by the long FBG measurement region fall into a range, than the light collecting device 35 will receive light according to an intensity graph similar to that illustrated in FIG. 9. In this graph, the peaks have heights that depend on the amount of light reflected from the grating at the corresponding temperature, which in turn depends on the length of the long FBG exposed to that temperature.

The central peak in the graph $\lambda_{mode}$ therefore corresponds to the temperature that occurs most frequently in the length of the long FBG measurement region, namely the mode in the distribution. In this case, however, the values of the maximum and minimum temperatures $T_{min}$ and $T_{max}$ can be harder to identify from the data results, as by virtue of being less likely to occur than the mode, and they therefore appear as smaller values in the intensity diagram.

Figure 7:
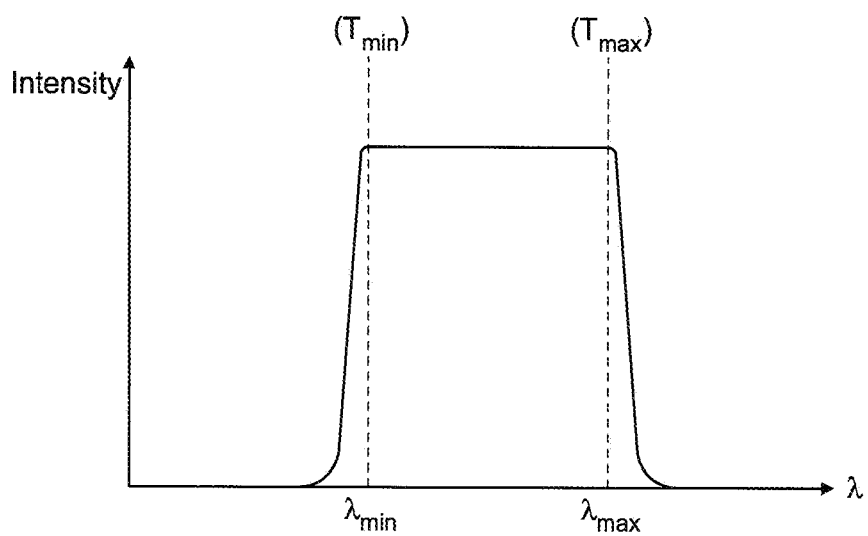
FIG. 7 is a schematic illustration of the output received from the sensor system shown in FIG. 3 for a long FBG indicating a range of temperatures.

This implementation of sensor system therefore provides more information on the distribution of the temperature values, than the sensor system implementation described with reference to FIG. 7. However, in the arrangement of FIG. 7, $T_{min}$ and $T_{max}$ are easier to detect, by virtue of providing a stronger signal.

Based on the light signals received from the optical fibre 33, the controller 36 can therefore deduce the value of the parameter being measured. This is achieved simply by calibrating the default grating period of the FBG with a known parameter, such as a reference temperature or strain, and deducing the amount of variation of the grating period in operation. This aspect of the operation of FBG sensors is well known in the art, and will not be described in detail here.

As described above, it is possible to use a single optical fibre to detect the operating temperatures of the generator. In this case, the optical fibre 33 passes backwards and forwards though all of the regions of interest, such as the stator slots 13 in the stator. In particular, this allows the sensor system to detect problematic operating parameters along the entirety of sensor path length 34, not just at the specific locations where short FBGs have been installed as with the prior art. Alternatively, where more precise monitoring is required, it is also possible to use a plurality of optical fibres 33, and install a fibre optical cable with long FBG measurement period in each region of interest. In this case, one fibre may be used in one stator slot 12 for example or in one coil winding 13.

In alternative embodiments it is also possible to vary the types of measuring FBG regions incorporated within a single FBG optical fibre, in order to accommodate different kinds of measurement regimes.

Figure 10:
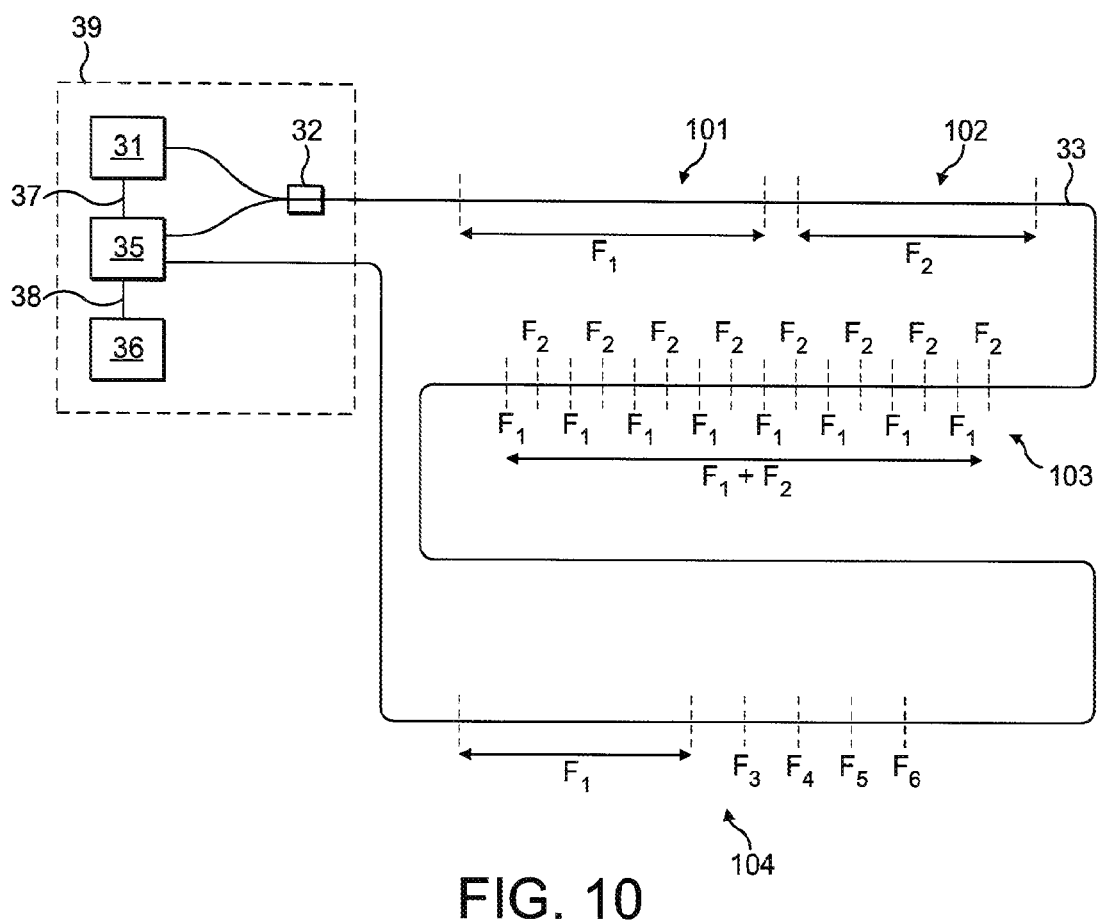
FIG. 10 is a schematic illustration of an alternative embodiment, in which a plurality of different FBG sensors are used in a single fibre.

FIG. 10 for example shows an alternative embodiment in which the optical fibre 33 is provided with a plurality of different FBGs implementations. In a first stretch of the fibre, separate first 101 and second 102 long FBG measurement regions are provided. Each of the regions 101 and 102 may be provided with long FBGs of different initial grating period (F1 and F2), allowing the combination to measure different ranges of the same variable, or even entirely different physical parameters.

In a second stretch of the optical fibre 33, long FBGs F1 and F2 are provided in region 103 in an alternating pattern of grating periods F1 and F2. This arrangement provides the same flexibility of measurement described for the first stretch of the fibre, but means that there is no physical separation between the different long FBGS F1 and F2. This allows both long FBGs to take measurements at the same position on the fibre.

In a third region 104 of the fibre, a long FBG F1 is provided adjacent one or more short FBGs F3, F4, F5 and F6. As noted above, in this context a short FBG is intended to mean a conventional FBG which occupies a localised position on the fibre. In other words, a FBG for which length is not a material feature of its operation. Long and short FBGs can be installed to monitor different parameters, providing the grating periods are selected so that one grating can be distinguished from another, or providing that the input light signals are time division multiplexed into the fibre, and can be distinguished from one another by their time of receipt at the collector.

Additionally, the fibre 33 may contain one or more pauses, that is regions where no FBGs, either long or short are installed.

In the generator example discussed above, the optical fibre 33 shown in FIG. 10 would allow the long FBG measurement region to be used in selected parts of the generator, such as in the slots 12 or windings 13, with the pauses and optional short FBGs located elsewhere, such as in the stator end wiring and wiring ring.

Many other installation schemes are possible. In each case, it only being necessary to arrange the appropriate FBG at the position of interest, and use time or wavelength division multiplexing as appropriate to distinguish the signals.

Although, example embodiments have been given in which the sensor system is installed in a generator to detect operational temperatures, it will be appreciated that it could be used in other equipment to detect other parameters. The system could usefully be installed into the nacelle, in particular electrical equipment cabinets to detect temperature, current, humidity, or arcing events for example. It could also be installed into wind turbine structural components, such as wind turbine blades, to detect strain or deformation.

Using the system described above, the operating parameters of an apparatus can be measured in real time. Furthermore, the system provides a distribution of values. This more detailed information can be particularly useful where failure of the apparatus has occurred. The sensor can also offer better surveillance, as it is able to detect changes in the parameter along the entire length of the measurement path.

Using the sensor system in control systems for an apparatus, where combined with a memory and a diagnostic or prognostic tool, can provide for early prediction of failures and therefore a longer operational lifetime of the apparatus.

In the case of a Condition Monitoring System (CMS) or a temperature measuring system for example, the sensor system would allow the wind turbine to be operated in response to the measured maximum temperature of one of the wind turbine components or devices without there being a requirement to build in an operational safety margin to account for operational unknowns. Thus, the wind turbine can be operated even where the measured parameter exceeds current safety margins, providing safety procedures are implemented when the maximum temperature detected exceeds a threshold value indicating that shut down is now necessary. A non-uniform temperature or a temperature in excess of an expected value for example could be indicative of a fault.

The system could also advantageously be used with cooling systems to improve performance. In particular, as the sensor system provides real time information regarding operational temperatures, the flow rate and temperature of the cooling fluid can be regulated according to need, rather than more generally based on less precise safety margins.

The invention has been described with reference to example implementations, purely for the sake of illustration. The invention is not to be limited by these, as many modifications and variations would occur to the skilled person. The invention is to be understood from the claims that follow.

The invention claimed is:

1. A wind turbine having a fibre optic sensor system for measuring an operating parameter of a wind turbine component, the fibre optic sensor system comprising:
a light source for outputting a light having wavelengths in a predetermined range;
an optical fibre configured to receive the light outputted by the light source, wherein the optical fibre comprises a long Fibre Bragg Grating, the long Fibre Bragg Grating having a grating of a predetermined grating period extending continuously over a first length portion of the optical fibre to form a continuous measurement region at a plurality of locations, wherein the first length portion of the optical fibre is coupled to the wind turbine component such that the continuous measurement region is located at a region of the wind turbine component to be sensed, and wherein the predetermined period of the grating at each location of the plurality of locations is dependent upon a value of the operating parameter at a respective one of the plurality of locations;
a light detector for receiving the light from the optical fibre and for providing an output signal indicating an intensity and a wavelength of the received light; and
a controller configured to receive the output signal from the light detector, and the controller configured to identify at least one of a maximum value and a minimum value from the values of the operating parameter at the plurality of locations based on the output signal.

2. The wind turbine of claim 1, wherein the grating of the long Fibre Bragg Grating is soft written to reflect an amount of light having a first wavelength such that the amount of the light reflected is proportional to a distance the light having the first wavelength has travelled in the grating.

3. The wind turbine of claim 2, wherein a maximum amount of the light having the first wavelength is reflected when the distance is equal to the first length portion.

4. The wind turbine of claim 1, wherein the controller is configured to determine values for the operating parameter at the respective ones of the plurality of locations in the continuous measurement region and determine a frequency value indicating how frequently each of the values occur in the continuous measurement region.

5. The wind turbine of claim 1, wherein the grating of the long Fibre Bragg Grating is hard written to reflect a maximum amount of light from a subset of the first length portion.

6. The wind turbine of claim 1, wherein the optical fibre comprises a second long Fibre Bragg Grating which provides a second continuous measurement region in the optical fibre.

7. The wind turbine of claim 6, wherein the second long Fibre Bragg Grating is located in a different part of the optical fibre relative to the long Fibre Bragg Grating.

8. The wind turbine of claim 7, wherein the second long Fibre Bragg Grating has a second predetermined grating period which is different than the predetermined grating period of the long Fibre Bragg Grating.

9. The wind turbine of claim 1, wherein the predetermined grating period of the long Fibre Bragg Grating alternates periodically between two values over the first length portion.

10. The wind turbine of claim 1, wherein the region of the wind turbine component includes at least one of: stator slots and coil windings of a generator, wherein the operating parameter comprises temperature.

11. The wind turbine of claim 1, wherein the optical fibre comprises one or more short Fibre Bragg Gratings at one or more points in the optical fibre which are disposed outside of the continuous measurement region.

12. The wind turbine of claim 11, wherein the region of the wind turbine component includes at least one of: stator slots and coil windings of a generator, wherein the operating parameter comprises temperature, and the one or more short Fibre Bragg Gratings are located outside of the coil windings or the stator slots.

13. The wind turbine of claim 1, wherein the operating parameter comprises one of more of: strain, temperature, pressure, or magnetic flux.

14. A method of determining an operating parameter of a wind turbine component, the method comprising:
coupling an optical fibre to the wind turbine component, wherein the optical fibre comprises a long Fibre Bragg Grating having a grating of a predetermined period extending continuously over a first length portion of the optical fibre to form a continuous measurement region at a plurality of locations, wherein the continuous measurement region is located at a region of the wind turbine component to be sensed, wherein the predetermined period of the grating at each location of the plurality of locations is dependent upon a value of the operating parameter at a respective one of the plurality of locations;
interacting, with the long Fibre Bragg Grating of the optical fibre, a light having received from a light source, wherein the light has wavelengths in a predetermined range;
receiving, with a light detector, the light from the optical fibre and providing an output signal from the light detector indicating an intensity of the light received by the light detector for each wavelength of the light that interacts with the long Fibre Bragg Grating; and
identifying, with a controller, at least one of a maximum value and a minimum value from the values of the operating parameter at the plurality of locations based on the output signal received by the controller from the light detector.

15. The method of claim 14, wherein the identifying further comprises, determining a range of wavelengths of the light that interacts with the predetermined period of the grating.

16. The method of claim 14, wherein the identifying comprises, determining an intensity for each wavelength of the light that interacts with the predetermined period of the grating, and determining which wavelength of light has the maximum intensity.

17. The method of claim 14, wherein the coupling comprises providing the continuous measurement region of the optical fibre in stator slots or coil windings of a generator to measure at least a temperature throughout a region of the stator slots or of the coil windings of the generator, wherein the region of the wind turbine component comprises the stator slots or the coil windings of the generator.

18. The method of claim 14, wherein the optical fibre comprises one or more short Fibre Bragg Gratings at points in the optical fibre outside of the continuous measurement region.

19. The method of claim 18, wherein the coupling comprises providing the continuous measurement region of the optical fibre in stator slots or coil windings of a generator to measure at least a temperature throughout a region of the slot or of the winding, and the short Fibre Bragg Gratings are located outside of the region of coil windings or the stator slots, wherein the region of the wind turbine component comprises the stator slots or the coil windings of the generator.

* * * * *